(No Model.) 3 Sheets—Sheet 1.
J. H. ROSS.
CENTRAL DRAFT OIL LAMP.

No. 564,718. Patented July 28, 1896.

Witnesses.
J. P. Brown
Nicholas M. Goodlett Jr.

Inventor
John H. Ross
By his Attorneys.
Witter & Kenyon (No Model.) 3 Sheets—Sheet 2.

J. H. ROSS.
CENTRAL DRAFT OIL LAMP.

No. 564,718. Patented July 28, 1896.

WITNESSES:
J. P. Brown.
Nicholas M. Goodlett Jr.

INVENTOR
John H. Ross
BY
Witter + Kenyon
his ATTORNEYS.

(No Model.)  3 Sheets—Sheet 3.

J. H. ROSS.
CENTRAL DRAFT OIL LAMP.

No. 564,718. Patented July 28, 1896.

Witnesses
J. P. Brown.
Nicholas M. Goodlett Jr.

Inventor
John H. Ross
By his Attorneys
Witter & Kenyon

UNITED STATES PATENT OFFICE.

JOHN HOWARD ROSS, OF BIRMINGHAM, ENGLAND.

CENTRAL-DRAFT OIL-LAMP.

SPECIFICATION forming part of Letters Patent No. 564,718, dated July 28, 1896.

Application filed August 30, 1893. Serial No. 484,366. (No model.)

*To all whom it may concern:*

Be it known that I, JOHN HOWARD ROSS, a subject of the Queen of Great Britain and Ireland, and a resident of Birmingham, England, have invented a new and useful Improvement in Central-Draft Oil-Lamps, of which the following, taken in connection with the accompanying drawings, is a specification.

The invention relates to hanging lamps having a central draft, and has for its object improvements in various details of the lamp whereby a simpler, more durable, and efficient construction is provided, as will hereinafter appear.

The invention consists of the features hereinafter set forth.

Figure 1:
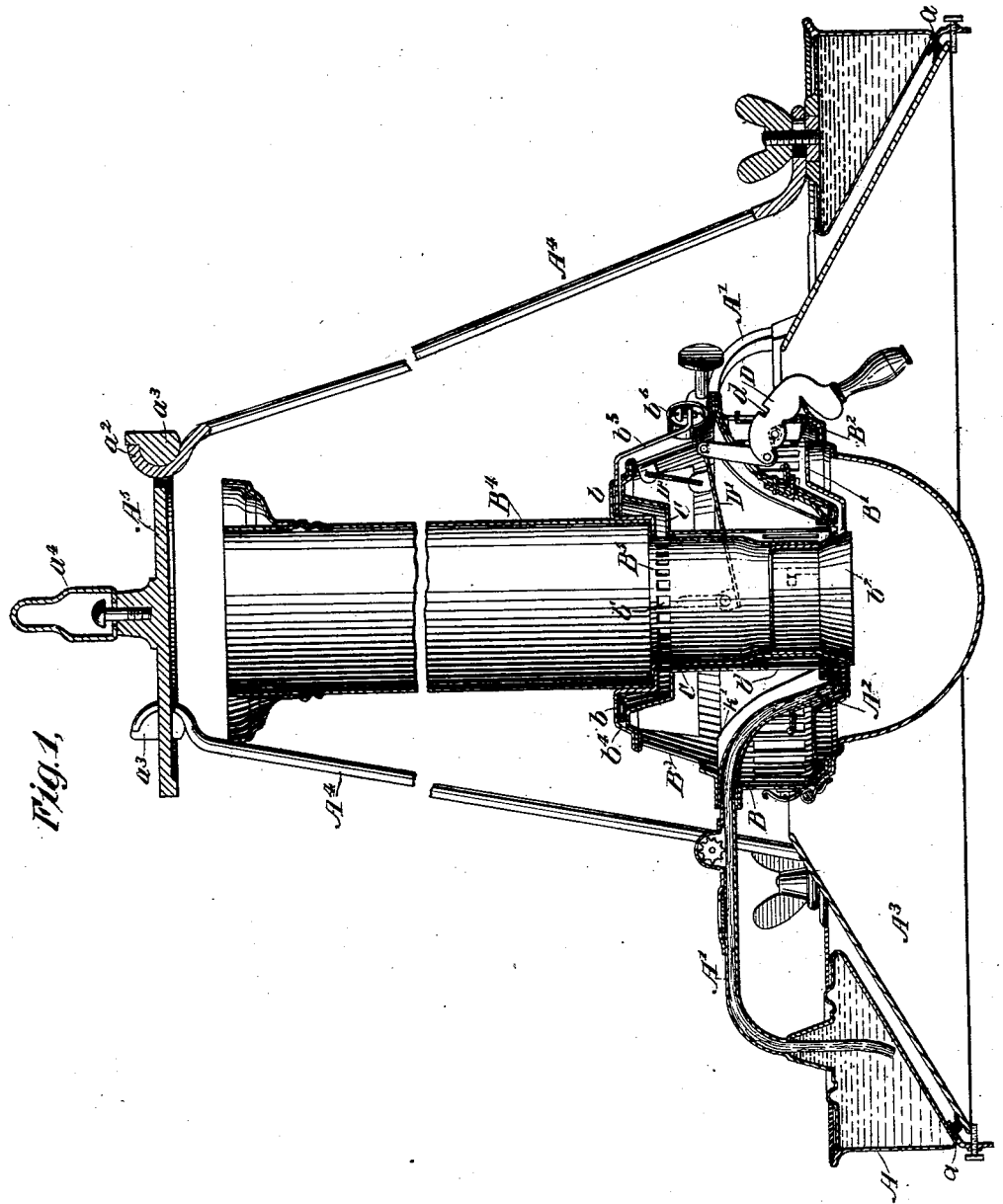
Figure 2:
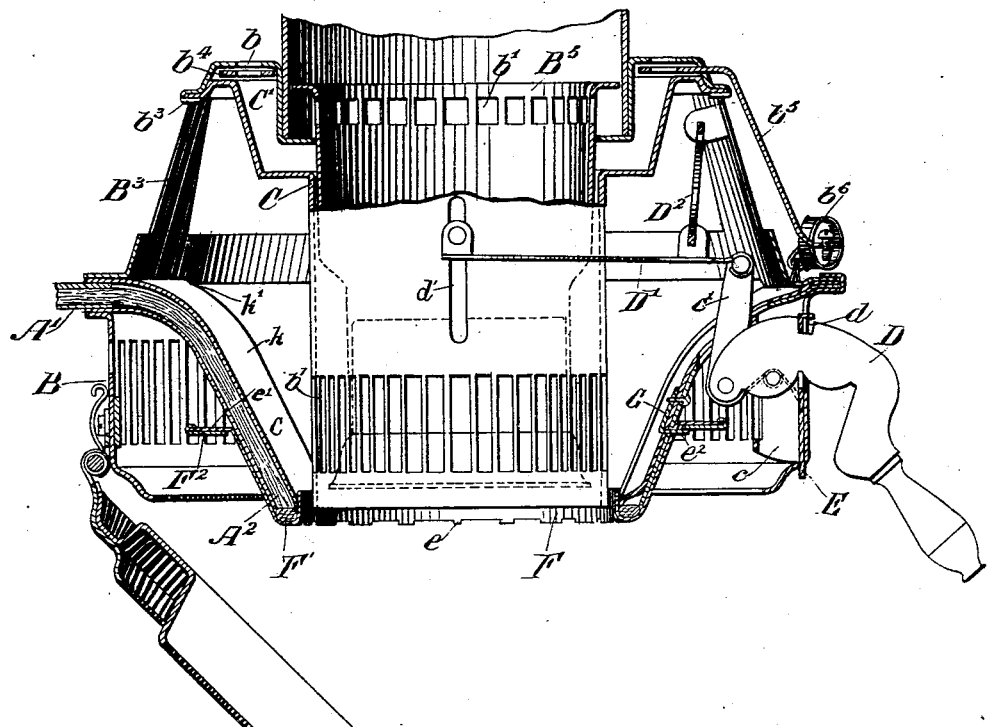
Figure 4:
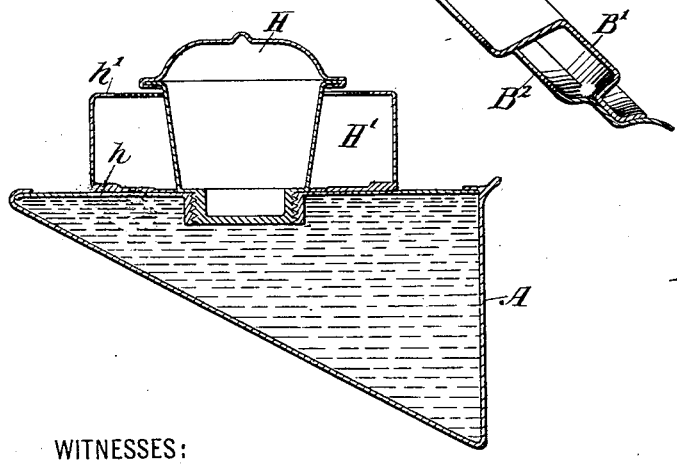
Figure 5:
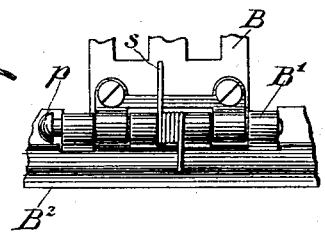
Figure 3:
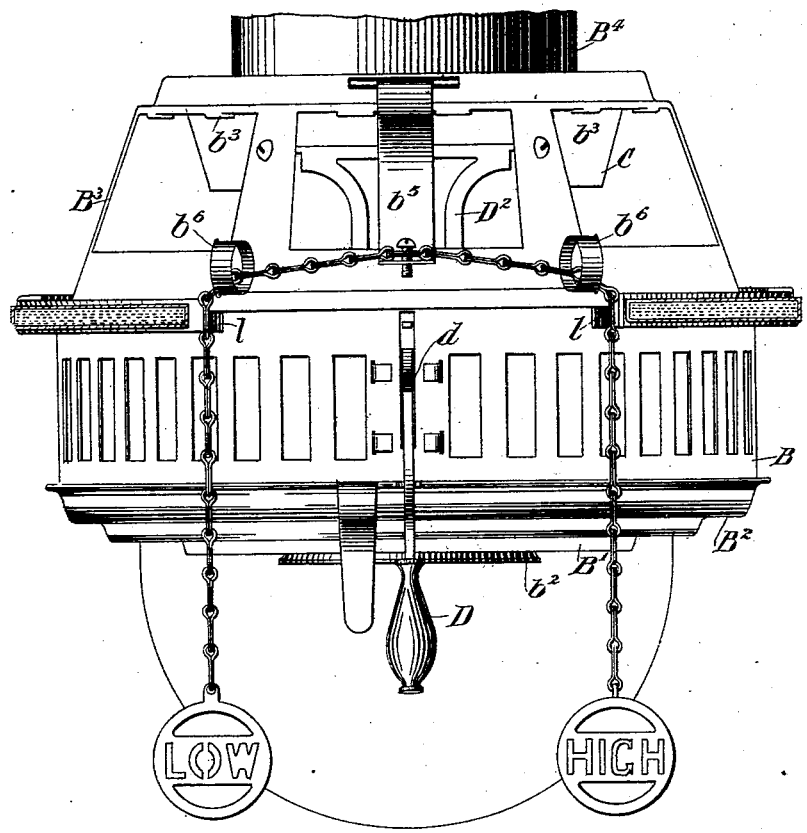
Figure 6:
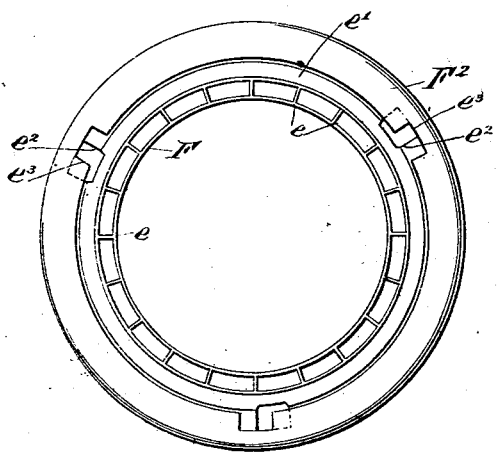

In the drawings, Figure 1 is a central vertical section of a lamp embodying my invention. Fig. 2 is a central vertical section of the lamp on an enlarged scale, the reservoir and hangers being removed and part of the chimney being broken away. Fig. 3 is an elevation of the lamp with the reservoir and hangers removed, the chimney being broken away and the wick-tubes being in section. Fig. 4 is a sectional view of a portion of the reservoir, showing the drip-cup. Fig. 5 is an elevation of a detail, showing the bezel-ring and deflector-ring hinged on a common pintle and having the yielding stop. Fig. 6 is a plan view of the burner-cap.

Similar letters designate corresponding parts throughout the drawings.

The annular reservoir A is provided with a plurality of wick-tubes A', which converge in an annular conical wick-tube $A^2$, opening downward approximately on a level with the upper surface of the reservoir. The walls of this annular wick-tube are so arranged that they provide converging passages leading from the converging wick-tubes to an annular channel at the mouth of the annular wick-tube, so that the wicks may form an annulus at the mouth thereof. Between the converging wick-passages of the annular wick-tube the walls thereof fit close together, as shown at the right in Fig. 1, the wick-passages themselves being pressed up in one or both walls of the annular wick-tube, as at $k$.

The reservoir is flaring on its inner side, and near its lower edge is provided with a series of suitable supports adapted to uphold the conical reflector $A^3$, between the lower edge of which and the contiguous surface of the reservior are arranged a series of soft cushions $a$, preferably of rubber, to prevent the rattling of the reflector. The cushions $a$ may be fastened upon the reflector or upon the reservoir, as shown. Suitably fixed to the reservoir are a plurality of removable hangers $A^4$, having outwardly-turned hooks $a^2$ at their upper ends passing through openings in a hanger-plate $A^5$ and engaging circular grooved shoulders $a^3$ thereon. The plate is provided with a suitable fastening $a^4$ for suspending the lamp.

Secured against the wick-tubes A', and extending below the same, is a slotted or perforated rim B, to which are hinged on one side to a common pintle $p$ the deflector-ring B' and the overlapping bezel-ring $B^2$. The hinge of the bezel-ring is provided with a yielding stop, preferably in the form of a spring $s$, which prevents the bezel-ring and its globe from falling open with a severe jar when released from the catch D, as hereinafter referred to, and preventing the globe from striking the reservoir. Secured to overlapping edges of the rim B is an open conical rim $B^3$, stamped from sheet metal, and having an upper horizontal portion provided with perforations $b$ and extending downward and provided with an inwardly-projecting flange forming a support for the chimney $B^4$ and for the movable open tube $B^5$, which has perforations $b'$ in its upper end and a removable flaring deflector $b^2$, lined with fine clay, porcelain, or some such similar substance. The rim $B^3$ is recessed or notched at $k'$ to fit over the pressed or struck-up wick-passages shown at $k$, Fig. 2, and the rim B is similarly notched at $l$, Fig. 3, to fit around the feed-wick tubes. These parts are thus held firmly together.

A tube C, stamped from sheet metal and at its upper end following approximately the horizontal, vertical, and inwardly-flanged portions of the piece $B^3$, is secured at its upper end to the rim $B^3$ by means of tongues $b^3$, stamped therein. The upper portions of the tubes C and $B^5$ thus form between them a counter-draft passage for the inlet of air into the chimney when the tube $B^5$ is in its lowest position, and the perforations $b'$ therein register with the lower end of the passage. This passage, moreover, is controlled by a damper $b^4$, arranged to regulate the inlet-openings $b$, and provided with an arm $b^5$, to which are attached operating-chains passing through guide-rings $b^6$. The tube C is concentric with and surrounds the tube $B^5$ and is provided at its lower end with slots or perforations $b^7$.

A spring-catch D, adapted to engage the bezel-ring $B^2$ and hold it and the deflector-ring B' in place, is pivoted to a bracket $c$, attached to the inner side of the rim B, and is normally held so as to engage the bezel-ring by means of a suitable spring. To the inner end of this catch is pivotally connected a link $c'$, whose other end is pivotally connected to a bifurcated lever D', suspended from brackets struck up from the rim $B^3$ by means of a freely-swinging hanger $D^2$. The inner ends of the lever D' is provided with short studs $d$, passing through slots $d'$ in the tube C and engaging the upper portion of the inner movable tube $B^5$. The catch D, the lever D', and the tube $B^5$ are so arranged that when the catch is lifted the tube $B^5$ is also lifted, so that its perforations $b'$ are cut off from the air-channel C', and the channel is closed by the imperforate portion of the tube. The mouthpiece $b^2$ of the tube $B^5$ is at the same time lifted above the lower end of the tube C and the mouth of the annular wick-tube $A^2$.

A gravity-bolt E, which may be assisted by a spring, is provided for the catch D, which slides in a suitable groove in the rim B and engages a notch $d$ in the catch D when the latter is raised and holds it there. The lower end of the bolt protrudes slightly below the edge of the rim B, so as to be struck by the edge of the deflector-ring B' when the latter is put in its normal position, so that the catch D is released and may engage the bezel-ring and the tube $B^5$ may fall to its normal position.

Upon the mouth of the annular wick-tube is fixed a removable burner-cap F, having its mouth fretted, as shown at $e$, or perforated, and normally carrying an annular burner-wick F'. This burner-cap is conical in form to correspond with the form of the annular wick-tube $A^2$, and has an outwardly-turned flange $e'$, provided with perforations $e^2$, which reach up into the conical portion of the burner-cap. Upon the flange $e'$ is fixed a movable ring $F^2$, having perforations $e^3$, adapted to register with the perforations $e^2$. The movement of the ring $F^2$ on the flange $e'$ is limited by means of a slot and pin. Several pins G, corresponding in number with the perforations in the flange and ring, are fixed to the annular wick-tube, so as to project upon its outer surface, and when the burner-cap is fixed in place they pass through the registering perforations $e^2$ and $e^3$. The ring $F^2$ is then turned so that its imperforate portion covers the perforations $e^2$ on the flange $e'$, and the burner-cap is locked in place with its burner-wick in close contact with the feed-wicks. It will be noticed that in adjusting the burner-cap it is not itself turned in the least, so that all rubbing and abrasion of the contacting-surfaces of the feed-wicks and burner-wick are avoided. This, it will be seen, is an important advantage. The feed-wicks may be adjusted by ordinary wick-raisers. When the burner-wick is burned out, it may be easily renewed.

The reservoir A is provided with a filling-orifice closed by a screw-threaded stopper H. The filling-orifice is provided with a drip-cup H', having an inwardly beveled or sloping bottom $h$ and a cylindrical flanged wall $h'$.

In lighting the lamp the catch D is lifted, the bolt F engages the catch, and the bezel and deflector rings, together with the globe carried by the bezel-ring, drop, giving access to the burner-wick. The spring $s$ gradually stops the downward movement of these parts, so that an undue shock to the lamp or breakage of the globe is prevented. The operation of the catch D elevates the tube $B^5$, as heretofore explained, so that the counter-draft passage C' is closed at the same time the deflector $b^2$ is elevated, thereby affording a free and direct passage of the flame and its products up through the tube $B^5$ and chimney $B^3$, preventing an undue fluttering of the flame and directing all the air-draft upon the flame at the burner-cap. When the wick is lighted, the globe and rings B' and $B^2$ are swung to place, the bolt F being forced out of engagement with the catch D and the tube $B^5$ descending to place. The counter-draft passage C' is then open, subject to control of the counter-damper $b^4$, and the lamp is in operative condition.

It will be noted that the slotted rim B and deflector-ring B' provide an air-passage to the flame on its outer side, and that the open rim $B^3$ and tube C provide an air-passage to the flame on its inner side. Moreover, this inner air-passage is provided with a branch leading from a point above the flame, through the slots $b^7$ of the tube C, down to the deflector $b^2$, where the air is delivered hot from its contact with the draft-tube $B^5$ in a thin sheet into the flame. This arrangement of air-drafts effectually contributes to a complete consumption of all the products of combustion and produces a very brilliant flame.

What I claim as new, and desire to secure by Letters Patent, is—

1. In a central-draft lamp, the combination of a downwardly-opening annular wick-tube, a vertically-adjustable central draft-tube, provided with a counter-draft passage and means comprising a lever and a catch for the lever, said means being operatively connected with the central draft for adjusting the same, substantially as set forth.

2. In a central-draft lamp, the combination of a downwardly-opening annular wick-tube, a vertically-adjustable central draft-tube, a bezel-ring hinged on one side, a catch for retaining it in normal position said catch being operatively connected with the central draft-tube, whereby when the bezel-ring is unfastened and fastened by the catch the draft-tube is simultaneously adjusted with respect to the wick-tube, substantially as set forth.

3. In a central-draft lamp, the combination of a downwardly-opening annular wick-tube, a central draft-tube for the products of combustion, air-passages leading to the mouth of the wick-tube on both sides thereof, and a counter-draft passage provided with a damper and leading into the central draft-tube, said draft-tube being so arranged as to open and close the counter-draft passage according to its adjustment, substantially as set forth.

4. In a central-draft lamp, the combination of a downwardly-opening annular wick-tube, a downwardly-extending perforated rim B mounted upon the outer edge of the wick-tube, upwardly-extending open rim $B^3$ mounted upon the outer edge of the wick-tube and having an inwardly-extending flange, a central tube C having a flaring upper end mounted upon said rim $B^3$ so as to leave a draft-passage $C'$, a damper for said draft-passage, a central draft-tube $B^5$ having a flange at its upper end resting upon the said flange of the rim $B^3$ and provided with perforations $b'$ normally registering with the air-passage $C'$, substantially as set forth.

5. In a central-draft lamp, the combination of an annular wick-tube, a central draft-tube vertically adjustable with respect to the wick-tube, a bezel-ring hinged on one side, a catch for retaining the bezel-ring in normal position, said catch being so operatively connected with the draft-tube as to adjust the draft-tube according to its position of engagement or disengagement with the bezel-ring, a bolt to engage the catch when the latter is in its disengaged position and to retain the draft-tube in its corresponding position, said bolt being arranged to be disengaged by the bezel-ring when the latter is moved to engage the catch, substantially as set forth.

6. In a central-draft lamp, the combination of an annular wick-tube having a plurality of projections, a removable annular burner-cap adapted to fit over the mouth of the said annular wick-tube provided with means to prevent its rotation and a lock for retaining it in place, substantially as set forth.

7. In a central-draft lamp, the combination of an annular wick-tube having a plurality of projections, a removable annular burner-cap adapted to fit over the mouth of the said annular wick-tube and having slots or perforations adapted to receive said projections, said burner-cap being provided with a movable ring adapted to take behind said projections and retain the burner-cap firmly in place, substantially as set forth.

8. In a central-draft lamp, the combination of an annular downwardly-opening wick-tube provided with a feed-wick, a removable annular burner-cap provided with an annular burner-wick, said burner cap and wick being adapted to fit over the mouth of said downwardly-opening wick-tube so that the burner-wick and feed-wick are in close contact, substantially as set forth.

9. The combination of the annular wick-tube $A^2$, the feed-wick tubes $A'$, the lower rim B and the upper rim $B^3$, said rims made of sheet metal and having their adjoining edges overlapped between the feed-wick tubes, and one of said rims having recesses at its outer edge fitting over corresponding elevations in the annular wick-tube, whereby the rims and annular wick-tubes are held firmly in place, substantially as set forth.

JOHN HOWARD ROSS.

Witnesses:
ERNEST HARKEN,
J. J. WOODGATE.